United States Patent Office 3,467,539
Patented Sept. 16, 1969

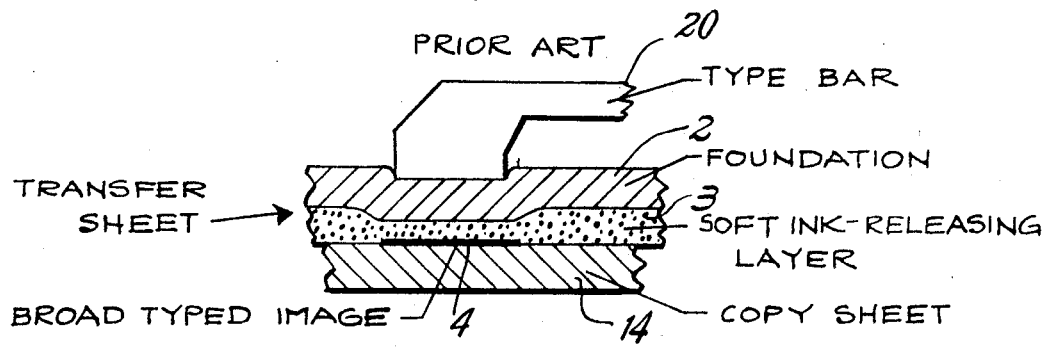
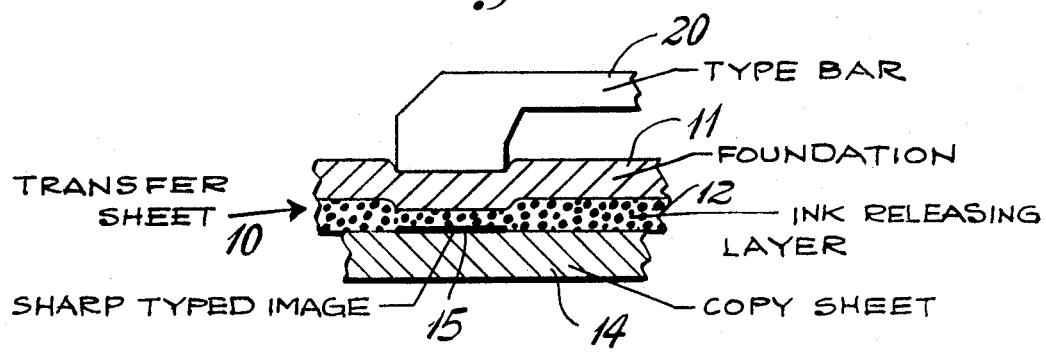

3,467,539
INK-RELEASING SHEETS AND RIBBONS
Allan T. Schlotzhauer, Locust Valley, and Douglas A. Newman and Warren W. Platz, Glen Cove, N.Y., assignors to Columbia Ribbon and Carbon Manufacturing Co., Inc., Glen Cove, N.Y., a corporation of New York
Filed Apr. 21, 1966, Ser. No. 544,227
Int. Cl. B41c 1/06
U.S. Cl. 117—36.1          5 Claims

ABSTRACT OF THE DISCLOSURE

Pressure-sensitive transfer sheets and ribbons having a non-transferable microporous resin binder containing pressure-exudable ink. The microporous resin is formed from a mixture of a copolymer of styrene and methyl methacrylate and a second thermoplastic resin which is a polymer of a vinyl ester or of a vinyl acetal or polystyrene and which is soluble in the same solvent as the copolymer and compatible therewith.

---

Solvent carbons of the type having a porous, resinous layer including pressure-exudable ink compositions are a rather recent development in the art. Basic U.S. Patent No. 2,820,717 relates to products of this type in which the resinous binder material is a rather specific copolymer of vinyl acetate and vinyl chloride. Since the discovery of resinous ink-releasing layers, a great deal of research and development has been conducted by the industry to uncover other resins which could be used in place of the copolymer of the patent to provide transfer sheets having improved properties.

While vinyl acetate-vinyl chloride copolymers do provide solvent carbons which enjoy a very high degree of commercial success, there is some room for improvement with respect to the sharpness and uniformity of density of the images typed from such carbons and the cleanliness of the carbon paper. At first it was thought that these disadvantages were directly related to the softness of the copolymer but attempts to overcome them by using harder resins such as polystyrene, polyvinyl chloride, acrylic resins and the like were unsuccessful since these resins do not provide solvent carbons which function as well in this regard as those provided by the copolymer.

It has been found that the vinyl copolymer produces an ink-releasing layer which provides duplicate images of good intensity when using liquid oils as the ink vehicle, but that such oils tend, to a slight degree, to sweat or exude from the layer on standing or upon the application of pressure such as exerted by a typewriter roll. Thus the ink layer is not completely clean to the touch and sometimes produces roll marks on the copy sheet. This effect may be overcome, as taught by U.S. Patent No. 2,984,582, by the use of semi-solid ink vehicles in place of the liquid oil. However, such vehicles substantially reduce the intensity of the images which can be produced so that the resultant carbon papers are primarily suitable only as pencil carbons. It is also possible to reduce the amount of oil and pigment and thereby render the ink layer cleaner. However, this results in a reduction of the imaging strength and useful life of the carbon paper.

It appears that different resins form different pore structures with incompatible oils and it is not completely understood whether this is due to a difference in the degree of incompatibility or may be due to a difference in the oleophobic properties of the resins. In any event it has been found that vinyl chloride-vinyl acetate copolymer resins in general tend to form a very fine microporous structure with incompatible oils, thereby resulting in a very spongy and very resilient layer in which the resin is present substantially completely as a fine network which retains little, if any, of the original strength, resistance and hardness of the resin itself. While such a fine, soft structure has generally been considered desirable, we have found that it is disadvantageous for certain uses since it permits the exudation of ink under the effects of very slight pressures. Under the effects of normal imaging pressure, the areas of such layers immediately adjacent to the impressed areas also yield to some extent so that ink is exuded not only from the area where desired but also from the immediately adjacent areas, thereby forming duplicate images which are filled-in and broader than desired, as illustrated by FIG. 1 of the drawing. FIG. 1 shows a prior art transfer sheet 1 having a flexible foundation 2 carrying a soft ink-releasing layer 3 based upon a vinyl chloride-vinyl acetate copolymer binder material. Under the effects of the pressure of a type bar 20, the ink-releasing layer compresses not only directly under the type bar but also in areas adjacent thereto so that the image 4 formed on the copy sheet 14 is broader in dimension than the type bar. Such broadness results in the filling-in of the images and the creation of an overall fuzziness or lack of clarity of the typed copy.

It is the object of the present invention to provide solvent carbon sheets and ribbons which produce sharper, clearer and more uniform intense images than heretofore available and which are clean to the touch and exude a limited amount of ink under the effects of imaging pressures.

It is another object of this invention to provide solvent carbon sheets and ribbons on which the ink-releasing layer has a strong, heavy network of resinous binder material rather than a fine, soft network, so that the layer is sufficiently firm or hard that the exudation of ink is restricted substantially completely to the areas impressed with imaging pressures.

The objects of the present invention are accomplished through the cooperation between styrene-methyl methacrylate copolymers and vinyl resinous binder materials in pressure-sensitive, ink-exudable layers for transfer sheets and ribbons.

Other features and advantages will hereinafter appear.

In the drawing:

FIGURE 1 is a diagrammatic cross-section, to an enlarged scale, of a pressure-sensitive, ink-releasing solvent carbon according to the prior art, illustrating the broad compressibility characteristics thereof and the type of images produced therefrom.

FIG. 2 is a diagrammatic cross-section, to an enlarged scale, of a pressure-sensitive, ink-releasing solvent carbon according to the present invention, illustrating the sharp compressibility characteristics thereof and the type of images produced therefrom.

The objects and advantages of the present invention are accomplished by the discovery of a new resinous binder system which comprises a mixture of a styrene-methyl methacrylate copolymer and a second thermoplastic vinyl resin, which is selected from the group consisting of polymers of vinyl esters, vinyl acetals and polystyrene which are soluble in the same volatile organic solvent as the copolymer and compatible therewith, and incompatible with the same oil as the copolymer Of all the synthetic thermoplastic resinous binder materials tested, including various styrene copolymers and various acrylic and methacrylic acid ester copolymers only styrene-methyl methacrylate copolymers were found to have the necessary compatibility with the vinyl resins mentioned and solubility properties and the exact incompatibility relationship with oleous materials necessary to produce porous, lean, pressure-sensitive transfer layers exhibiting improved imaging properties with regard to compressibility and sharpness, clarity and uniformity of imaging strength.

The preferred styrene-methyl methacrylate copolymer for use according to the present invention is one commercially available from the Dow Chemical Company under the trademark Zerlon 150. This copolymer contains about 30% to 40% styrene and 60% to 70% methyl methacrylate and has a molecular weight of about 200,000. Other copolymers containing 20% to 45% styrene and 55% to 80% methyl methacrylate and having a molecular weight above about 100,000 are considered to be equally satisfactory for obtaining the desired results.

The second thermoplastic vinyl resin is preferably polyvinyl acetate, polyvinyl formal or polystyrene. These resins are soluble in methyl ethyl ketone and ethyl acetate, the preferred solvents for the styrene-methyl methacrylate copolymer, and are compatible therewith in the amounts used. Other suitable vinyl resins include polyvinyl butyrate, polyvinyl butyral and the like polyvinyl esters and acetals.

The following examples are set forth as illustrative of some compositions suitable for forming the ink-releasing layers of the present invention, and should not be considered as being limitative.

Example 1

Ingredients: Parts by weight
- Zerlon 150 _____ 7.7
- Polyvinyl formanl (Formval) _____ 5.9
- Mineral oil _____ 6.8
- Flushed alkali blue (60% mineral oil) _____ 3.8
- Refined rapeseed oil _____ 5.1
- Lecithin _____ 0.1
- Black toner pigment _____ 5.2
- Toluene _____ 26.0
- Ethyl acetate _____ 22.5
- Methyl ethyl ketone _____ 16.9

100.0

Example 2

Ingredients:
- Zerlon 150 _____ 6.0
- Polyvinyl acetate (Vinylite AYAF) _____ 6.0
- Butyl stearate _____ 7.0
- Refined rapeseed oil _____ 7.0
- Sulfonated vegetable oil _____ 1.7
- Blue toning paste _____ 2.2
- Black toner pigment _____ 6.6
- Methyl ethyl ketone _____ 26.3
- Ethyl acetate _____ 10.2
- Toluene _____ 27.0

100.0

Example 3

Ingredients:
- Zerlon 150 _____ 5.9
- Polystyrene (Styron) _____ 6.1
- Refined rapeseed oil _____ 7.0
- Butyl stearate _____ 7.0
- Sulfonated vegetable oil _____ 1.7
- Blue toning paste _____ 2.2
- Black toner pigment _____ 6.6
- Methyl ethyl ketone _____ 26.3
- Ethyl acetate _____ 10.2
- Toluene _____ 27.0

100.0

The compositions set out in the foregoing examples are preferably compounded by wetting the resins with toluene and mixing with the oleous material and coloring matter in a ball mill to a smooth uniform consistency and then adding the other volatile organic solvents and continuing mixing for a short period of time to form a uniform coating composition having the desired viscosity and coatable consistency.

The composition is then coated onto a suitable flexible foundation web, such as paper or plastic film, and the volatile solvents are evaporated to form the ink-releasing layer. The coated web is then cut into sheet lengths or ribbons, as desired.

In many cases it is preferred that the foundation be first coated with a resinous layer which may serve to prevent the ink layer from being absorbed by the foundation, in the case of paper, or may serve to provide a more receptive surface for the ink layer such as by solvent-bonding action, in the case of plastic films. It is also advantageous in some cases to apply antistatic coatings to either side of a plastic film foundation prior to the application of the ink-releasing layer.

As shown by FIG. 2 of the drawing, the pressure-sensitive ink-releasing transfer sheets 10 produced according to the present invention have a flexible foundation 11 carrying an ink-releasing layer 12 which is relatively firm or hard but which is still sufficiently porous and compressible that liquid ink can be exuded therefrom in sufficient amounts under the effects of normal imaging pressure such as a type bar 20 to form on a copy sheet 14 a duplicate image 15 of excellent sharpness, clarity and uniformity of intense density. The underlying reason is not completely clear but the present ink-releasing layers are only sensitive to firm imaging pressures and have the ability of confining the effects of imaging pressure substantially completely to the impressed areas, the stress carried over to the adjacent areas of the layer being insufficient to cause ink exudation from such adjacent areas. This important feature is illustrated by FIG. 2 of the drawing.

As illustrated by the formulations shown in the examples, the styrene-methyl methacrylate copolymers of the present invention are used together with a second thermoplastic vinyl resin binder material to produce transfer sheets or ribbons which still retain a sufficiently firm or strong porous structure and the desired compressibility characteristics necessary for the formation of sharp, clear, uniform images. It is preferable that the styrene-methyl methacrylate copolymer comprises from about 45% to about 80% by weight of the resin mixture, the remaining 55% to about 20% being the other vinyl resin. In all cases the styrene-methyl methacrylate copolymer comprises at least about 40% and no more than about 95% by weight of the resin mixture, the remaining 60% to 5% being the second thermoplastic vinyl resin.

The incompatible oleous or oleaginous materials found suitable for use according to the present invention are preferably the liquid oils, such as animal, vegetable and mineral oils although mixtures thereof with semi-solid pasty oleous materials such as lanolin, petrolatum, hydrogenated vegetable oils and the like may be used. Such oleous materials have been found suitable in amounts ranging from about one-half up to about three times the weight of the mixture of resinous binder materials.

Any desired coloring matter may be used in the ink-releasing layers of the present invention including pigments such as carbon black, graphite and magnetic iron oxide, dyestuffs and reactive color-forming components. The amount of colorant varies greatly depending upon the nature and state of the colorant, whether dissolved or dispersed, and the type of ink-releasing layer being produced, whether for typewriter carbons, one-time carbons, pencil carbons or the like. In general, the amount of colarant may be varied between one-tenth and ten times the weight of the resinous binder material.

Other conventional materials such as fillers or extenders, wetting agents and other additives may be included as will be obvious to those skilled in the solvent carbon paper art in the light of the present disclosure.

We claim:
1. A pressure-sensitive transfer element comprising a flexible foundation supporting a porous ink-releasing layer, said layer comprising a firm, porous, substantially non-pressure-transferable network comprising 1 part by weight of a resinous mixture of from about 40% to 95% by weight of a copolymer of from about 20% to 45% styrene and from about 80% to 55% methyl methacrylate and from about 60% to 5% by weight of a second thermoplastic vinyl resin selected from the group consisting of polymers of vinyl esters, vinyl acetals and polystyrene and having uniformly dispersed within the pores thereof a pressure-exudable ink comprising from about ½ to 3 parts by weight of an oleous ink vehicle which is incompatible with said copolymer and an amount of coloring matter.

2. A pressure-sensitive transfer element according to claim 1 in which the oleous ink vehicle comprises a liquid oil.

3. A pressure-sensitive transfer element according to claim 1 in which the copolymer consists of about 30% to 40% styrene and about 60% to 70% methyl methacrylate.

4. A pressure-sensitive transfer element according to claim 1 in which the vinyl resin is polyvinyl acetate.

5. A pressure-sensitive transfer element according to claim 1 in which the resinous mixture comprises from about 45% to about 80% by weight of said copolymer and from about 55% to about 20% by weight of said vinyl resin.

References Cited

UNITED STATES PATENTS

| | | | |
|---|---|---|---|
| 2,944,037 | 7/1960 | Clark | 117—36.1 |
| 3,159,592 | 12/1964 | McHugh et al. | 117—36.1 |
| 3,330,791 | 7/1967 | Mater et al. | 117—36.1 |
| 3,336,150 | 8/1967 | Takahashi et al. | 117—36.1 |

MURRAY KATZ, Primary Examiner

U.S. Cl. X. R.

117—76, 155; 260—23, 885